(12) United States Patent
Kawasaki

(10) Patent No.: US 11,190,675 B2
(45) Date of Patent: Nov. 30, 2021

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Ryo Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/025,123

(22) Filed: Sep. 18, 2020

(65) Prior Publication Data
US 2021/0092302 A1  Mar. 25, 2021

(30) Foreign Application Priority Data
Sep. 24, 2019 (JP) .............................. JP2019-173317

(51) Int. Cl.
*H04N 5/232* (2006.01)
*H04N 5/225* (2006.01)

(52) U.S. Cl.
CPC ..... *H04N 5/232123* (2018.08); *H04N 5/2259* (2013.01)

(58) Field of Classification Search
None
See application file for complete search history.

(56) References Cited

U.S. PATENT DOCUMENTS

| 4,794,417 | A | * | 12/1988 | Sekiguchi | ................ G02B 7/30 396/50 |
| 6,359,650 | B1 | * | 3/2002 | Murakami | ....... H04N 5/232945 348/333.04 |
| 6,954,233 | B1 | | 10/2005 | Ito | |
| 8,698,945 | B2 | * | 4/2014 | Foote | ............... H04N 5/232123 348/351 |

(Continued)

FOREIGN PATENT DOCUMENTS

| EP | 3054667 A1 | 8/2016 |
| EP | 3522523 A1 | 8/2019 |

(Continued)

OTHER PUBLICATIONS

English translation for JP 3733228 B2 Takeda (Year: 2006).*
Extended European Search Report dated Dec. 10, 2020, for Corresponding European Application No. 20197674.3.

*Primary Examiner* — James M Hannett
(74) *Attorney, Agent, or Firm* — Carter, DeLuca & Farrell LLP

(57) ABSTRACT

A control apparatus includes an acquiring unit configured to acquire a contrast evaluation value for each of a plurality of areas in an image, and a controlling unit configured to detect an in-focus position of a focus lens for each of the plurality of areas based on the contrast evaluation value. The controlling unit determines whether or not the focus lens approaches the in-focus position of each of the plurality of areas based on the contrast evaluation value. The controlling unit determines a driving direction of the focus lens based on a result of a determination. When detecting the in-focus (Continued)

position of one area of the plurality of areas, the controlling unit determines the driving direction of the focus lens based on the contrast evaluation value of another area of the plurality of areas other than the one area.

26 Claims, 11 Drawing Sheets

(56) References Cited

U.S. PATENT DOCUMENTS

| | | | |
|---|---|---|---|
| 2011/0293255 A1* | 12/2011 | Kikuchi | G03B 13/22 396/80 |
| 2017/0302862 A1 | 10/2017 | Shintani | |
| 2020/0296296 A1 | 9/2020 | Chino et al. | |
| 2021/0105411 A1* | 4/2021 | Honjo | B64C 39/024 |

FOREIGN PATENT DOCUMENTS

| | | |
|---|---|---|
| JP | 2001-116980 A | 4/2001 |
| JP | 2003-075716 A | 3/2003 |
| JP | 3733228 B2 * | 1/2006 |

* cited by examiner

CONTROL APPARATUS, IMAGE PICKUP APPARATUS, CONTROL METHOD, AND STORAGE MEDIUM

BACKGROUND OF THE INVENTION

Field of the Invention

The present invention relates to an image pickup apparatus including a focus mechanism, and more particularly to a focus control for detecting a plurality of in-focus positions.

Description of the Related Art

In recent years, an image pickup apparatus has been installed for various applications such as security and in various places such as factory lanes. Such an image pickup apparatus is required to acquire an image of a deep depth of field. A technique called Scheimpflug principle is known that deepens the depth of field of an image capturing scene by adjusting a focal plane by rotating an image pickup plane (performing a tilt control) so as to tilt the image pickup plane with respect to an image pickup optical axis plane that is orthogonal to an image pickup optical axis system for capturing an object.

Japanese Patent Laid-Open No. ("JP") 2003-75716 discloses an image pickup apparatus that detects an in-focus position for each of a plurality of objects based on a contrast evaluation value and that determines a focus position and a tilt control amount so as to focus on the plurality of objects. JP 2001-116980 describes an image pickup apparatus which stores a focus position that maximizes a contrast evaluation value for each of a plurality of objects and which detects an in-focus position for each of the plurality of objects.

However, in each of the image pickup apparatuses disclosed in JP 2003-75716 and JP 2001-116980, when the in-focus position is detected for each of the plurality of objects, a driving amount of a focus lens may increase, and thus it may take time.

SUMMARY OF THE INVENTION

The present invention provides a control apparatus, an image pickup apparatus, a control method, and a storage medium each of which can detect an in-focus position for each of a plurality of objects at high speed.

A control apparatus as one aspect of the present invention includes an acquiring unit configured to acquire a contrast evaluation value for each of a plurality of areas in an image, and a controlling unit configured to detect an in-focus position of a focus lens for each of the plurality of areas based on the contrast evaluation value. The controlling unit determines whether or not the focus lens approaches the in-focus position of each of the plurality of areas based on the contrast evaluation value. The controlling unit determines a driving direction of the focus lens based on a result of a determination. When detecting the in-focus position of one area of the plurality of areas, the controlling unit determines the driving direction of the focus lens based on the contrast evaluation value of another area of the plurality of areas other than the one area.

An image pickup apparatus including the above control apparatus, a control method corresponding to the control apparatus, and a storage medium storing a computer program that enables a computer to execute the control method also constitute other aspects of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
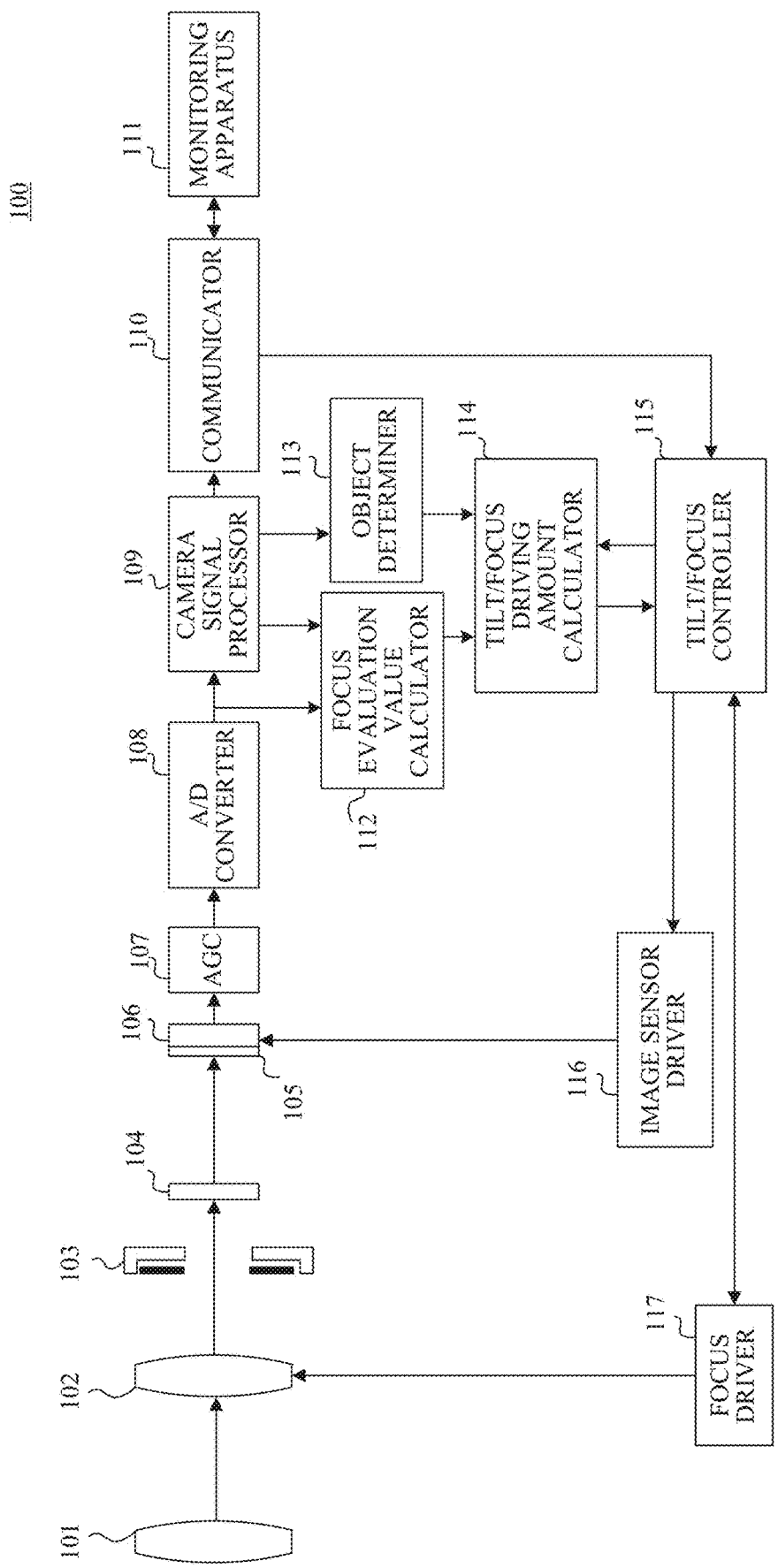
FIG. 1 is a block diagram illustrating an image pickup apparatus according to each embodiment.

First, a description will be given of a configuration of an image pickup apparatus according to each embodiment with reference to FIG. 1. FIG. 1 is a block diagram illustrating an image pickup apparatus 100. A zoom lens 101 is configured to vary a focal length by moving in an optical axis direction. A focus lens 102 is configured to perform a focus control by moving in the optical axis direction. A diaphragm unit 103 is configured to adjust a light amount. An image pickup optical system includes the zoom lens 101, the focus lens 102 and the diaphragm unit 103. In this embodiment, the image pickup apparatus 100 includes the image pickup optical system and an image pickup apparatus main body that are integrally configured. However, this embodiment is not limited to this, and is also applicable to an image pickup system including an image pickup apparatus main body and an image pickup optical system detachably attached to the image pickup apparatus main body.

Light passing through the image pickup optical system forms an image on the image sensor 106 via a bandpass filter (BPF) 104 and a color filter 105. The bandpass filter 104 may be configured to be movable back and forth for the optical path of the image pickup optical system. The image sensor 106 is a CMOS sensor or a CCD sensor, and is configured to photoelectrically convert an optical image as an object image formed by the image pickup optical system and to output an analog electric signal as an image pickup signal. An AGC 107 is configured to adjust a gain of the analog electric signal output from the image sensor 106. An AD converter 108 is configured to convert the analog electric signal into a digital signal (digital image pickup signal) and to output it to a camera signal processor 109. The camera signal processor 109 is configured to perform various image processing on the digital image pickup signal and to generate an image signal. A communicator 110 is configured to output the image signal to a monitoring apparatus 111 that is connected to the image pickup apparatus 100 by wire or wireless communication, to receive a command from an external apparatus, and to output a control signal such as command to a tilt/focus controller 115 in the image pickup apparatus 100.

A focus evaluation value calculator 112 as an acquiring unit is configured to receive an RGB pixel value or a luminance value from the AD converter 108 or the camera signal processor 109 for each object area to be targeted (target area), and to acquire an evaluation value relating to a contrast of a specific frequency (hereinafter also referred to as a contrast evaluation value). That is, the focus evaluation value calculator 112 is configured to acquire respective contrast evaluation values of a plurality of areas in the image (hereinafter also referred to as a plurality of object areas). The focus evaluation value calculator 112 may also acquire distance information based on a phase difference or the like, in addition to the contrast evaluation value. An object determiner 113 is configured to detect an object from an image capturing screen according to a result from the camera signal processor 109, and to output object information. The object determiner 113 can also determine an object of a user set or of a preset, for example, can determine a person and a car.

A tilt/focus driving amount calculator 114 is configured to receive the evaluation value from the focus evaluation value calculator 112 and the object information from the object determiner 113. The tilt/focus driving amount calculator 114 is configured to calculate an optimum tilt angle and focus position according to a scene by using the evaluation value, the object information, and a tilt angle and a focus position from the tilt/focus controller 115.

The tilt/focus controller 115 is configured to control the tilt angle and the focus position based on the calculated tilt angle and the focus position. Further, the tilt/focus controller 115 is configured to control focusing (perform focus control) by an autofocus (AF) or a manual focus (MF) according to an instruction from the communicator 110. Further, the tilt/focus controller 115 is configured to receive current positions of the image sensor 106 and the focus lens 102 from an image sensor driver 116 and a focus driver 117, and to transmit the current positions to the tilt/focus driving amount calculator 114. The tilt/focus controller 115 is configured to transmit the driving position to the image sensor driver 116 and the focus driver 117 based on the tilt angle and the focus position calculated by the tilt/focus driving amount calculator 114. In this embodiment, the tilt/focus driving amount calculator 114 and the tilt/focus controller 115 configure a controlling unit that detects the in-focus position for each of the plurality of areas based on the contrast evaluation value.

The image sensor driver 116 is configured to tilt the image sensor 106 according to a tilt angle transmitted by the tilt/focus controller 115. Normally, a rotation axis for tilting the image sensor 106 is located at a center of the image capturing screen, and the image sensor 106 tilts around the rotation axis. However, this embodiment is not limited to this. The focus driver 117 is configured to control a position of the focus lens 102 according to a focus setting position transmitted by the tilt/focus controller 115.

Figure 2A:
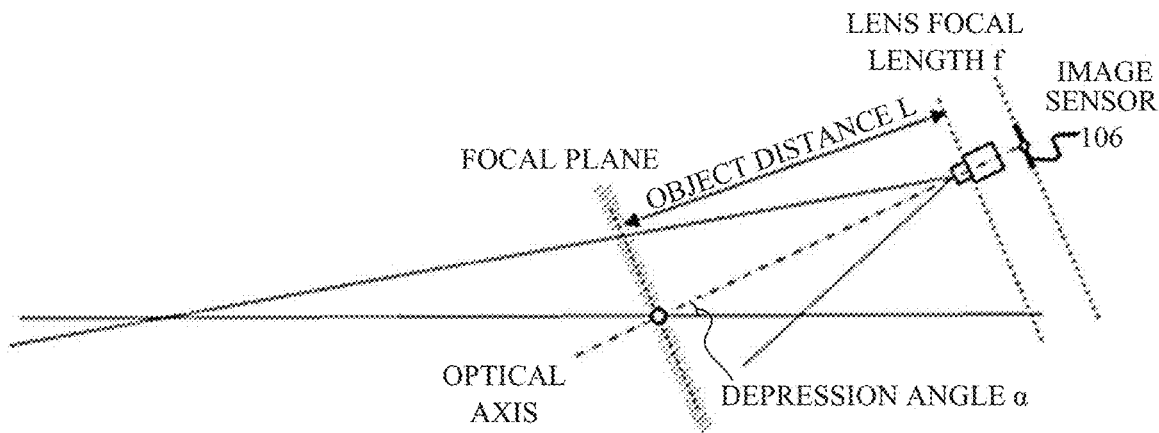
FIGS. 2A to 2C are explanatory diagrams illustrating a tilt control according to each embodiment.
Figure 2B:
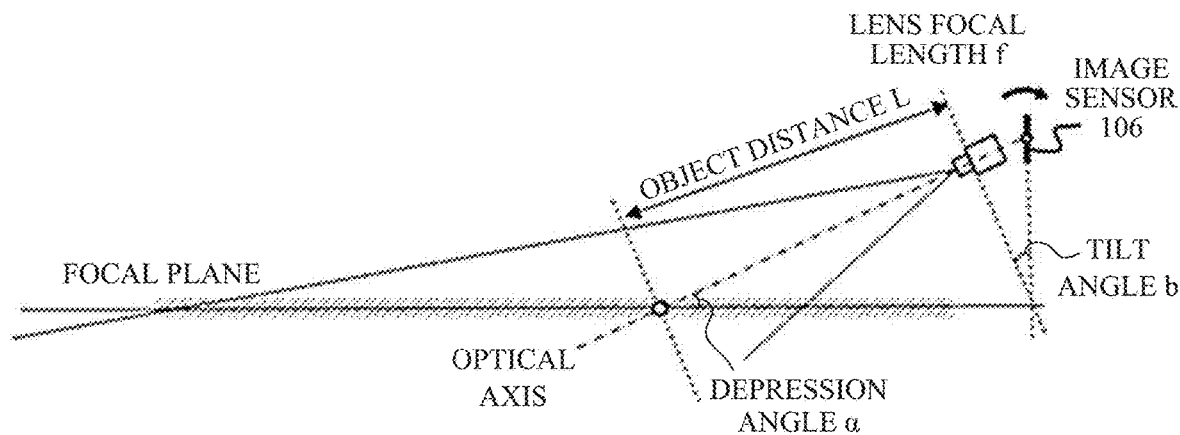
Figure 2C:
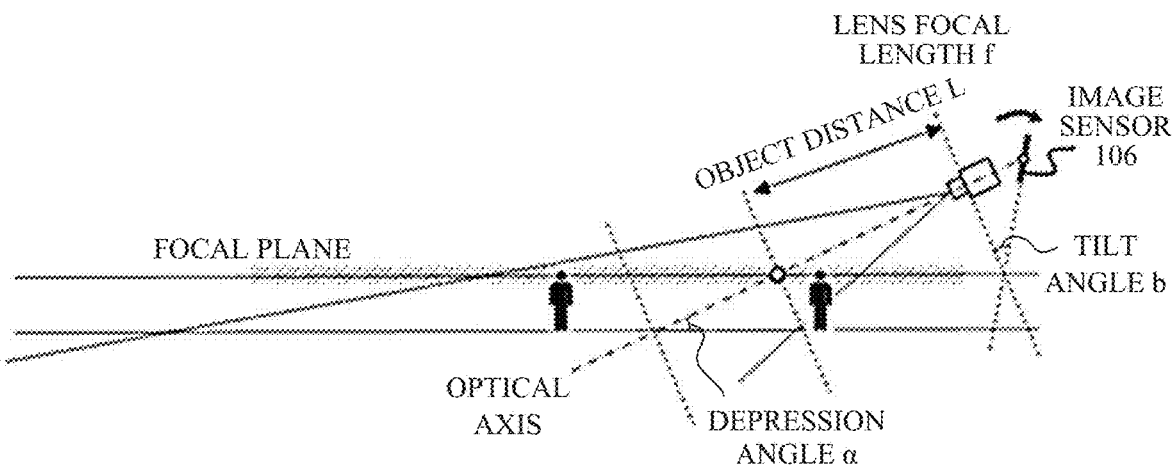

Next, tilt control (tilt image capturing) will be described with reference to FIGS. 2A to 2C. FIGS. 2A to 2C are explanatory diagrams illustrating a tilt control. FIG. 2A illustrates a state in which a principal plane of an optical system (image pickup optical system) and the image sensor 106 are parallel to each other. An object distance L is in focus, and its focal plane is parallel to each of the optical system and the image sensor 106. FIG. 2B illustrates a state in which the image sensor 106 rotates around an image sensor rotation axis from the state illustrated in FIG. 2A and the tilt control is performed. When the tilt control is performed, the focal plane also rotates around a focal plane rotation axis corresponding to the image sensor rotation axis, based on the Scheimpflug principle. Thereby, it becomes possible to focus on all objects at a short distance to a long distance on a certain plane. The Scheimpflug principle is a principle in which when the principal plane of the optical system and the image pickup plane of the image sensor 106 intersect on one straight line, the focal plane also intersects on the same straight line. When a focal length is f, an object distance is L, and a depression angle is α, a tilt angle b is calculated by a following expression (1) according to the Scheimpflug principle.

$$b = \tan^{-1}(f/(L \tan \alpha)) \tag{1}$$

FIG. 2C illustrates a scene in which an image includes an object X (first object area) and an object Y (second object area). In this case, it is desirable to control the focal plane so that each face of each object is in focus as illustrated in FIG. 2C. Hence, it is necessary to control not only the tilt but also the focus. An optimum focal plane (that is, optimum tilt angle and focus position) differs for each object, and it is difficult for the user to manually adjust the focal plane.

Figure 3:
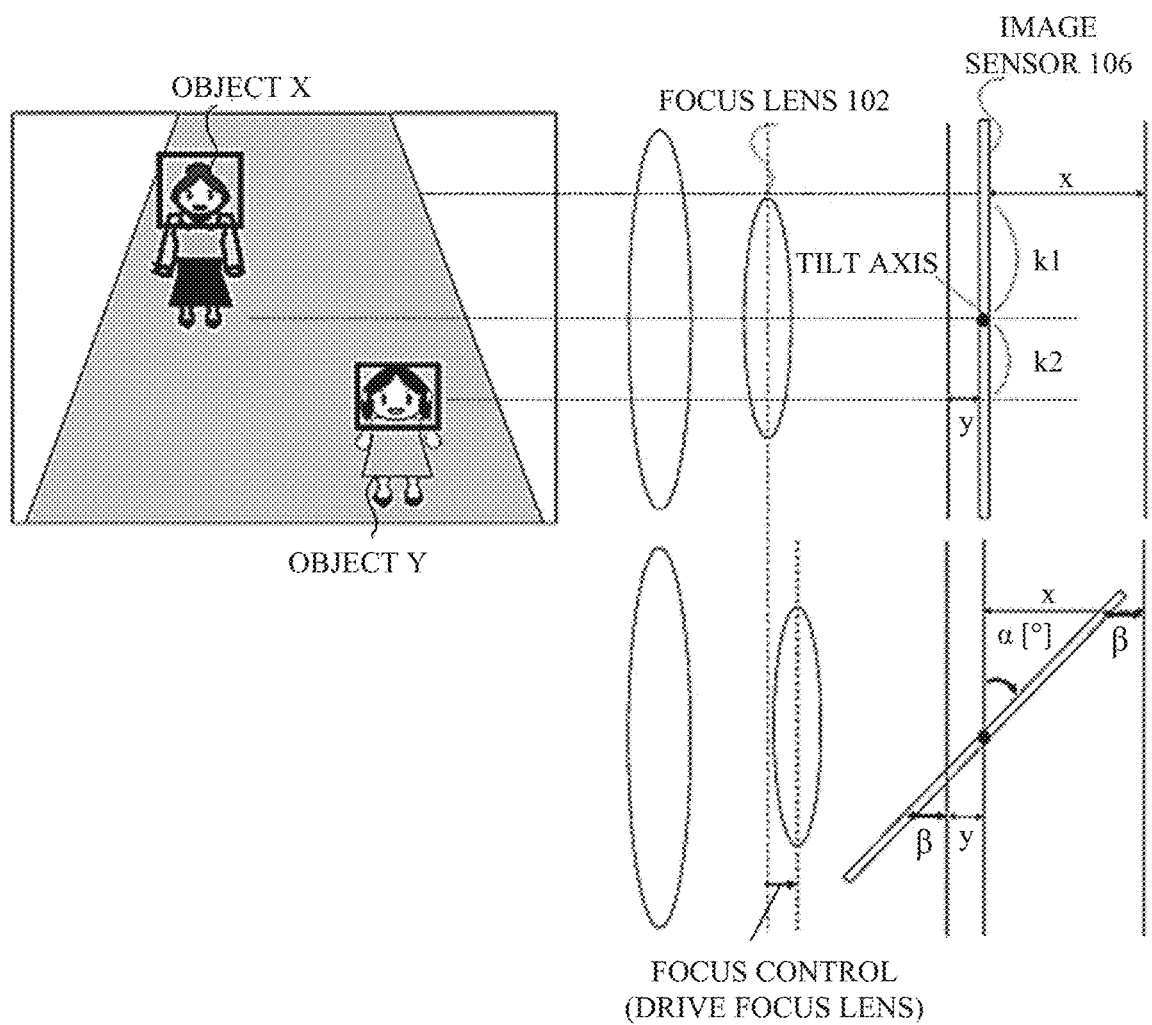
FIG. 3 is an explanatory diagram illustrating a focus control and a tilt control according to each embodiment.

An example will be described of a method for calculating the optimum tilt angle and focus position according to an object with reference to FIG. 3. FIG. 3 is an explanatory diagram illustrating the focus control and the tilt control. Similarly to FIG. 2C, as objects to be targeted, the object X and the object Y exist. A current tilt angle and position of the focus lens 102 have a positional relationship as illustrated in an upper part of FIG. 3. In FIG. 3, x is a correcting amount on the focal plane necessary for focusing on the object X, and y is a correcting amount on the focal plane necessary for focusing on the object Y. It is assumed that distances from a tilt axis on the image sensor 106 to each object are k1 [μm] for the object X and k2 [μm] for the object Y. When a tilt angle for simultaneously focusing on the objects X and Y is α [°] and a focus correcting amount on the focal plane is β, following expressions (2) and (3) are established.

$$x - \beta = k1 \times \tan \alpha + \beta \tag{2}$$

$$y = k2 \times \tan \alpha - \beta \tag{3}$$

By solving simultaneous equations of the expressions (2) and (3), the tilt angle a and the focus correcting amount can be calculated as expressed by following expressions (4) and (5).

$$\alpha = \tan^{-1}\left(\frac{x+y}{k1+k2}\right) \tag{4}$$

$$\beta = \left(\frac{k2 \times x - k1 \times y}{k1 + k2}\right) \tag{5}$$

A focus control amount can be simply calculated by dividing the focus correcting amount β by a sensitivity of the focus lens 102. The focus control amount can be accurately calculated by solving a high-order equation or a polynomial equation according to the sensitivity of the focus lens 102. However, the calculation method of this embodiment can be variously modified and changed within the scope of the gist.

Figure 4:
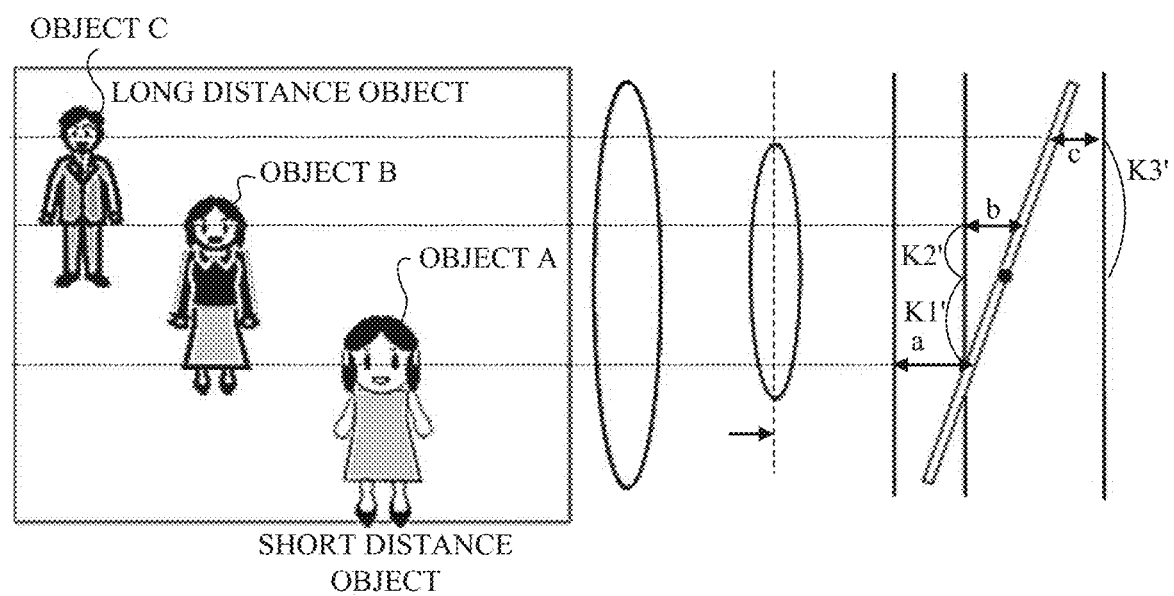
FIG. 4 is an explanatory diagram illustrating a focus control and a tilt control when there are three objects according to each embodiment.

Next, a case will be described where an image includes three or more objects (object areas) with reference to FIG. 4. FIG. 4 is an explanatory diagram of a focus control and tilt control when there are three objects. As illustrated in FIG. 4, when there are three objects A, B, and C (or there are three or more objects) located from a short distance to a long distance, it may not be possible to focus on all of the objects A, B and C. A description will be given of a possible control method where a [μm], b [μm] and c [μm] represent shift amounts on the focal plane for the objects A, B, and C, respectively.

A first method is a method of performing the focus control and the tilt control so as to minimize the maximum values of the shift amounts a [μm], b [μm] and c [μm]. According to this method, an object blur can be minimized in a scene illustrated in FIG. 6. A second method is a method of calculating an amount determined to be in focus, that is, a depth, and of controlling the shift amounts a [μm], b [μm] and c [μm] to be within the depth. The depth is a value determined by a cell pitch per one pixel of the image sensor 106 and a diaphragm value. When $F\Delta$ represents a depth, following expressions (6), (7) and (8) can be acquired.

$$F\Delta \geq k1' \times \gamma + \beta \quad (6)$$

$$F\Delta \geq k2' \times \gamma + \beta \quad (7)$$

$$F\Delta \geq k3' \times \gamma - \beta \quad (8)$$

When the shift amounts a [μm], b [μm] and c [μm] are within the depth, the user does not recognize an out-of-focus, and thus it is not necessary to perform the control for minimizing each maximum value of the shift amounts a [μm], b [μm], and c [μm] as that performed in the first method. It may be possible to perform a control in which firstly the second method is performed, and if the object of an image capturing target is not within the depth, the shift amounts are determined by the first method. In general, the depth for the tilt control becomes deeper on the long distance side than that on the short distance side, and thus a short distance object may be treated as a priority when the tilt control or the focus control is performed. Hereinafter, a specific description will be given in each embodiment.

First Embodiment

Figure 5:
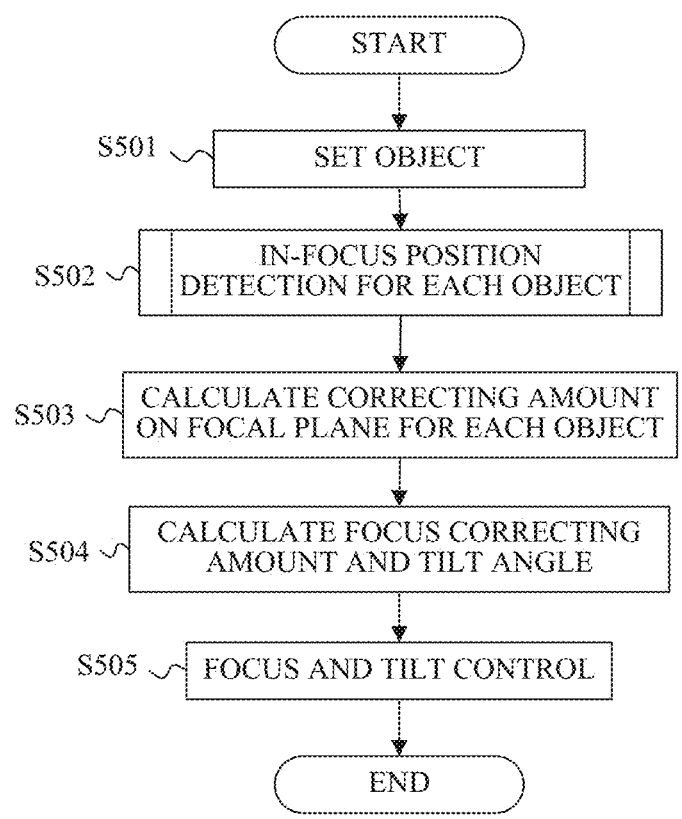
FIG. 5 is a flow chart illustrating a focus control and a tilt control according to a first embodiment.

A description will be given of processing executed by the image pickup apparatus 100 according to the first embodiment. FIG. 5 is a flow chart illustrating a focus control and a tilt control (main processing) in this embodiment. Each step in FIG. 5 are mainly executed by the tilt/focus driving amount calculator 114 or the tilt/focus controller 115.

First, in the step S501, the tilt/focus controller 115 sets a plurality of objects. The plurality of objects is automatically set by a face detection, an automatic detection or the like, or is designated by a user. Subsequently in the step S502, the tilt/focus controller 115 detects an in-focus position for each of the plurality of objects set in the step S501. The details of this processing will be described later.

Subsequently in the step S503, the tilt/focus driving amount calculator 114 calculates a correcting amount on a focal plane for each object based on the in-focus position detected in the step S502. These correcting amounts correspond to x and y in FIG. 3 and a, b and c in FIG. 4. For example, a correcting amount can be calculated by multiplying a difference between the current position of the focus lens 102 and the in-focus position by the sensitivity of the focus lens 102. Subsequently in the step S504, the tilt/focus driving amount calculator 114 calculates a focus correcting amount and a tilt angle for focusing on each object according to the method described above. Subsequently in the step S505, the tilt/focus controller 115 controls the focus driver 117 and the image sensor driver 116 based on the focus correcting amount and the tilt angle calculated in the step S504.

Figure 6:
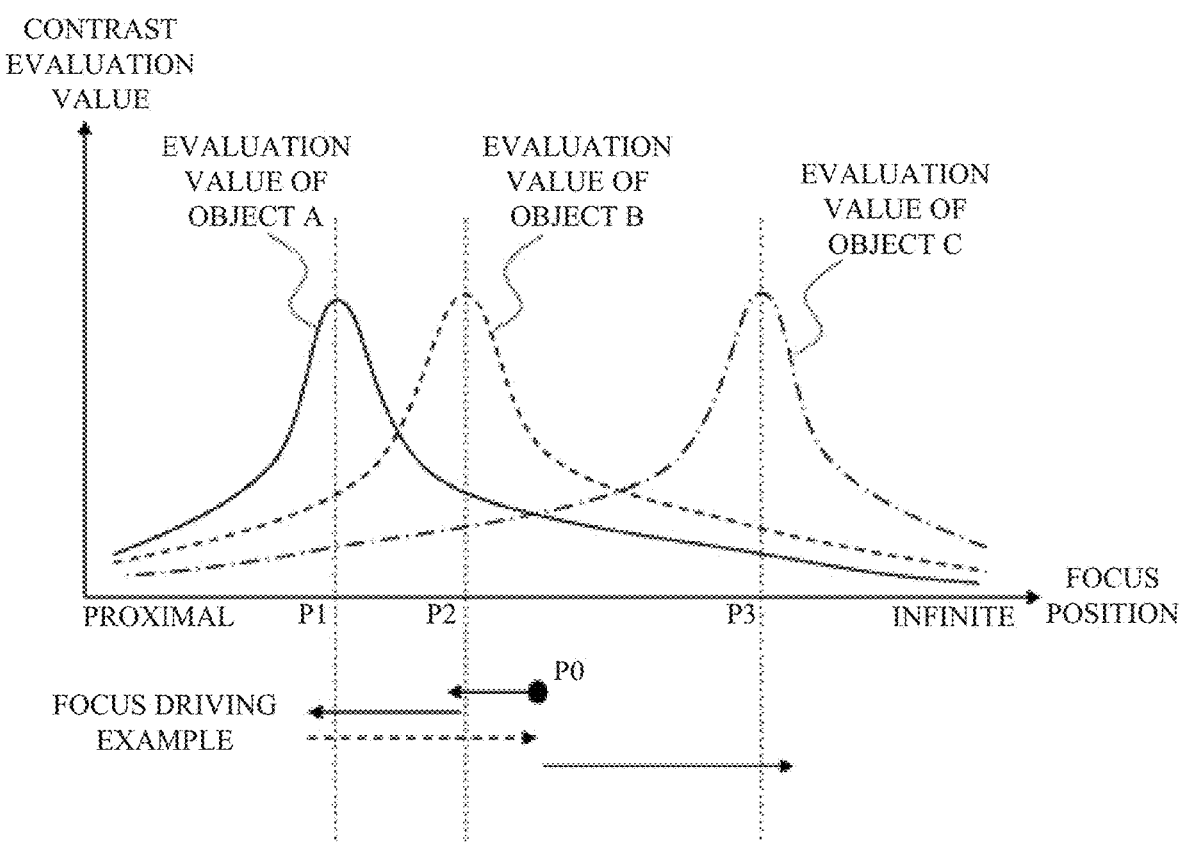
FIG. 6 is an explanatory diagram illustrating in-focus position detecting processing according to the first embodiment.

Next, a description will be given of an outline of in-focus position detecting processing (the step S502) for each object with reference to FIG. 6. FIG. 6 is an explanatory diagram illustrating the in-focus position detecting processing. In FIG. 6, a horizontal axis represents the focus position and a vertical axis represents the contrast evaluation value.

FIG. 6 illustrates each contrast evaluation value for each focus position when image capturing is performed on three objects A, B and C at different distances as illustrated in FIG. 4. The in-focus positions are set as P1, P2, and P3, respectively, and all of them are to be detected. In order to detect the in-focus positions P1, P2, and P3 at higher speed, it is important to perform focus scanning without waste. The focus scanning refers to moving a focus lens, acquiring a contrast evaluation value, and determining an in-focus position. It is determined whether or not the in-focus position is approaching (that is, in-focus direction) based on a variation in the contrast evaluation value during focus driving. Specifically, when the contrast evaluation value increases, it is determined as a forward direction, and when the contrast evaluation value decreases, it is determined as an opposite direction. The tilt/focus controller 115 determines a focus scanning direction based on the detection result of the in-focus direction. The focus scanning direction is a direction in which the focus lens moves.

A description will be given based on a focus scanning example (lower part in FIG. 6) of a case of performing the in-focus position detection from a focus position P0. First, the focus scanning starts from the focus position P0 in a predetermined direction (proximal side here). At this time, as the in-focus direction, the forward direction is determined for the object A and object B, and the opposite direction is determined for the object C. If there is an object determined to be in the forward direction, the scanning direction is not inverted. That is, the driving direction of the focus lens does not change. When the in-focus position P2 is passed through, a peak is detected of the evaluation value of the object B, and the in-focus position P2 is stored as the in-focus position of the object B. Since the in-focus position of object B is detected, the determination of the in-focus direction is not performed (or the detection result will be ignored) in the subsequent processing.

Subsequently, since the in-focus direction of the object A is the forward direction, the scanning direction is not inverted. That is, the driving direction of the focus lens does not change. When the in-focus position P1 is passed through, a peak is detected of the evaluation value of the object A, and the in-focus position P1 is stored as the in-focus position of the object A. Since the in-focus position of the object A is detected, the determination of the in-focus direction is not performed (or the detection result will be ignored), in the subsequent processing.

At this point, there is no object whose in-focus direction is the forward direction, and thus the scanning direction is inverted. That is, the driving direction of the focus lens changes. The past focus scanning indicates that the in-focus position of the object C does not exist between P0 and P1.

Hence, a skip drive is performed to the focus position P0, and the focus scanning starts from the focus position P0 in an infinite direction in order to shorten the focus scanning time. When the in-focus position P3 is passed through, a peak of the object C is detected, and the in-focus position P3 is stored as the in-focus position of the object C. The in-focus positions of all the objects are detected, and the focus scanning is terminated.

Figure 7:
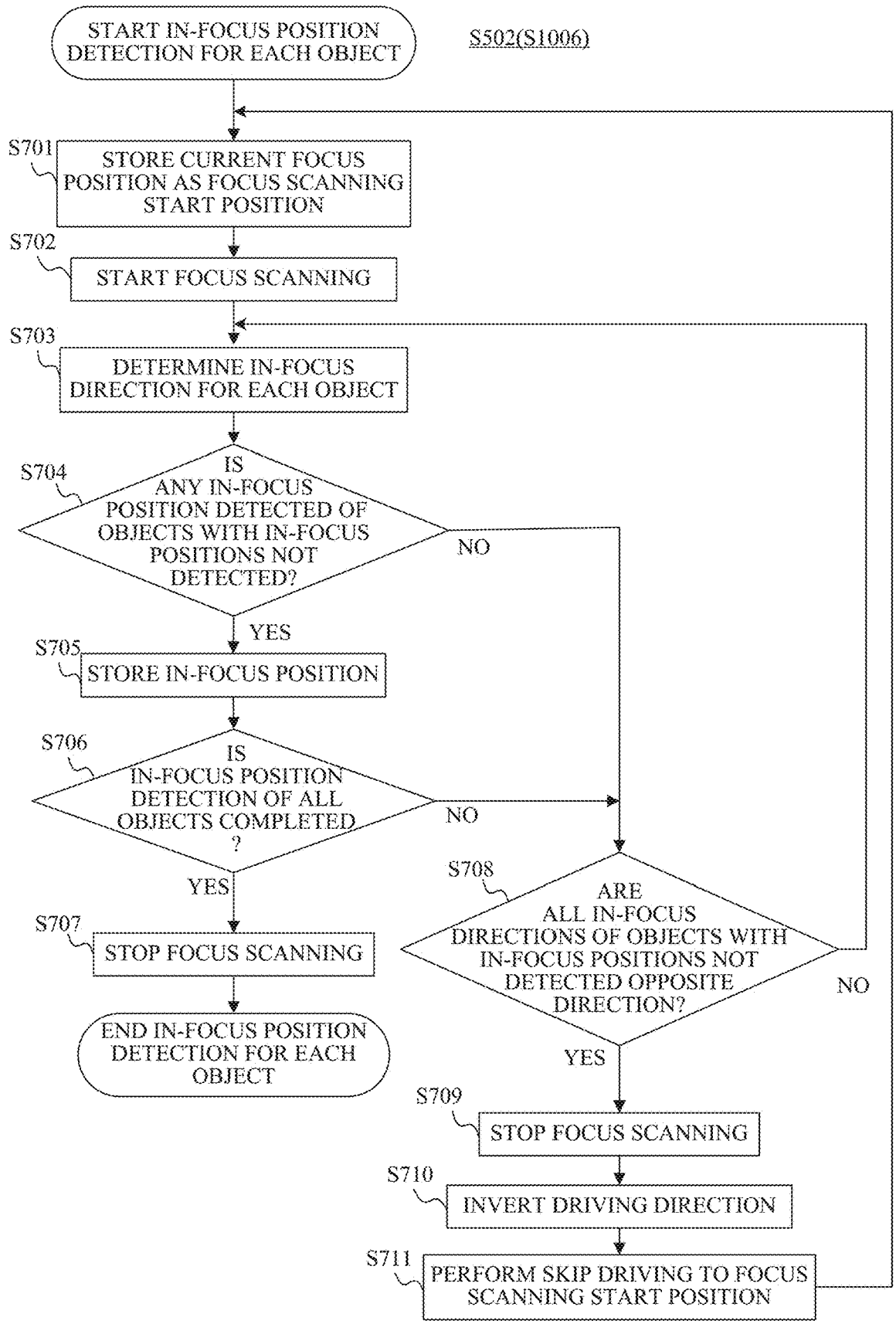
FIG. 7 is a flow chart illustrating the in-focus position detecting processing according to the first embodiment.

Next, in-focus position detecting processing (the step S502) will be described in detail with reference to FIG. 7. FIG. 7 is a flow chart illustrating the in-focus position detecting processing. Each step in FIG. 7 are mainly executed by the tilt/focus controller 115 or the focus driver 117.

First in the step S701, the tilt/focus controller 115 stores the current focus position as a focus scanning start position. Subsequently in the step S702, the tilt/focus controller 115 controls the focus driver 117 to start the focus scanning in an arbitrary direction. The faster a focus scanning driving velocity becomes, the lower a focus detection accuracy becomes, and the slower the focus scanning driving velocity becomes, the higher the focus detection accuracy becomes. The focus scanning velocity may be variable. For example, if it is determined to be close to an in-focus position of an object, that is, the contrast evaluation value of the object is high, the driving becomes slow, and if it is determined not to be close to any in-focus position of any object, that is, all the contrast evaluation val ties of the objects are low, the driving becomes fast. From this, it is possible to achieve both a high speed in-focus position detection time and a high in-focus position detection accuracy.

Subsequently in the step S703, the tilt/focus controller 115 determines the in-focus direction for each object set in the step S501. As described above, the in-focus direction is determined to be the forward direction for an object with a contrast evaluation value increasing. On the other hand, the in-focus direction is determined to be the opposite direction for an object with a contrast evaluation value decreasing.

Subsequently in the step S704, the tilt/focus controller 115 determines whether or not any of the in-focus positions is detected of the objects with the in-focus positions not detected. If any in-focus position is detected, the process proceeds to the step S705. In the step S705, the tilt/focus controller 115 stores the detected in-focus position as the in-focus position of the object. Subsequently in the step S706, the tilt/focus controller 115 determines whether or not the in-focus position detection is completed for all the objects set in the step S501. If the in-focus position detection is completed for all the objects, the process proceeds to the step S707. In the step S707, the tilt/focus controller 115 stops the focus scanning and terminates the in-focus position detecting processing.

On the other hand, if none of the in-focus positions is detected in the step S704, or if the in-focus position detection is not completed for all the objects in the step S706, the process proceeds to the step S708. In the step S708, the tilt/focus controller 115 determines the scanning direction. More specifically, the tilt/focus controller 115 determines whether or not all the in-focus directions of the objects with the in-focus positions not detected are the opposite direction. If all the in-focus directions of the objects are the opposite direction, the process proceeds to the step S709. In the step S709, the tilt/focus controller 115 stops the focus scanning. Subsequently in the step S710, the tilt/focus controller 115 controls the focus driver 117 to invert the scanning direction. Subsequently in the step S711, the tilt/focus controller 115 controls the focus driver 117 to perform the skip driving to the focus scanning start position stored in the step S701, and returns to the step S701. On the other hand, if any one of the in-focus directions is the forward direction in the step S708, the tilt/focus controller 115 does not invert the scanning direction and continues the focus scanning.

This embodiment can perform the in-focus detection at high speed by performing the focus control based on the contrast evaluation value of the plurality of objects. Thus, it is possible to speed up the tilt control and the focus control for focusing on the plurality of objects.

Second Embodiment

Next, a description will be given of processing executed by the image pickup apparatus 100 in the second embodiment. This embodiment relates to the in-focus position detecting processing for each object in the step S502, in a configuration in which the focus evaluation value calculator 112 also acquires not only the contrast evaluation value but also distance information based on a phase difference or the like. In this embodiment, a description similar to that of the first embodiment will be omitted.

Figure 8:
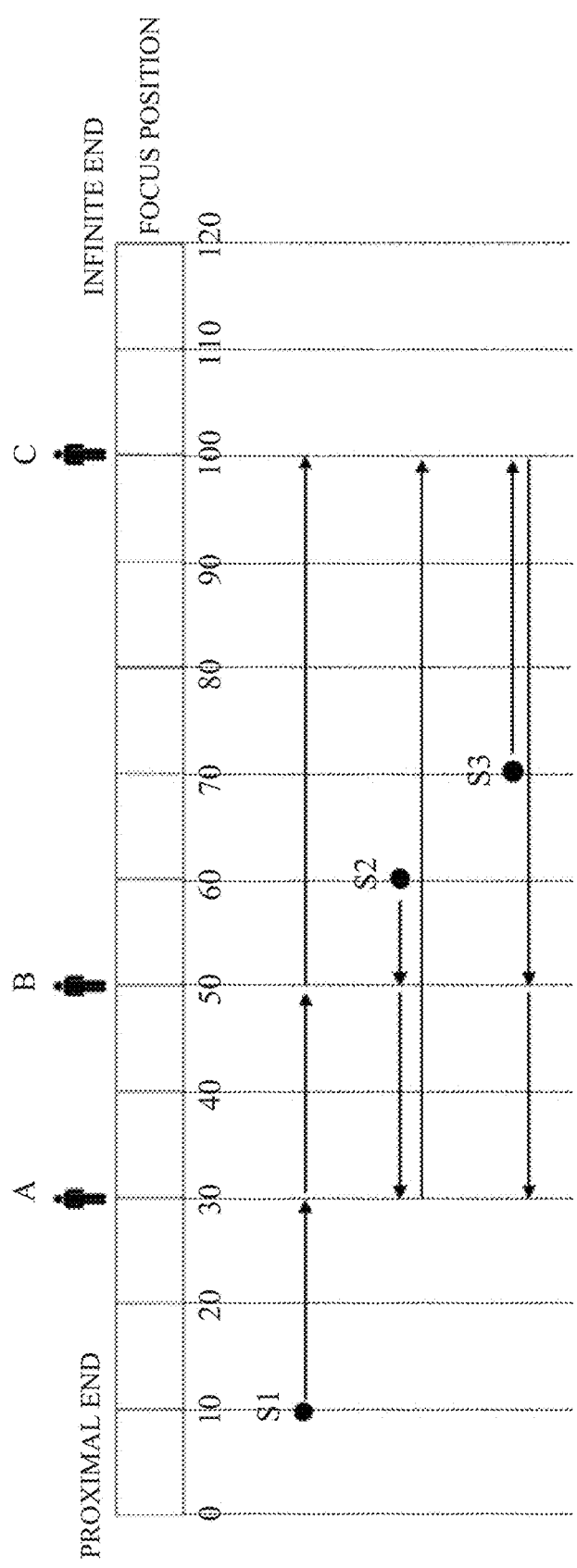
FIG. 8 is an explanatory diagram illustrating in-focus position detecting processing according to a second embodiment.

An outline will be described of the in-focus position detecting processing (the step S502) for each object with reference to FIG. 8. FIG. 8 is an explanatory diagram illustrating the in-focus position detecting processing. Upper part of FIG. 8 illustrates a focus position where a proximal end is 0 and an infinite end is 120. When three objects A, B, and C having different distances are captured as illustrated in FIG. 4, it is possible to calculate a focus position to focus on each object by acquiring the distance information on each object acquired based on a phase difference or the like and by using lens design information (cam data). In FIG. 8, as an example, it is assumed that an object A is at a focus position 30, an object B is at a focus position 50 and an object C is at a focus position 100. Each of these focus positions is not used as it is as an in-focus position detection result for each object because the accuracy may decrease depending on an acquiring method of distance information and an image capturing environment. Thus, focus scanning is performed using the contrast evaluation value so that an in-focus position can always be detected with high accuracy. The tilt/focus controller 115 determines a scanning start direction according to the focus position for each object calculated based on the distance information during the focus scanning.

Middle part of FIG. 8 illustrates a focus driving example when focus scanning starts from a focus scanning start position S1 at focus position 10, S2 at focus position 60 and S3 at focus position 70. A table in the lower part of FIG. 8 illustrates a focus driving amount to reach each object for each focus scanning start position S1, S2 and S3, that is, difference between the current focus position and the focus position for each object, a scanning start direction and a detection order of in-focus positions. The driving starts from the scanning start direction that is a direction in which a maximum focus driving amount becomes small, in order to scan the shortest path. When the scanning start position is S1, all the objects A, B, and C are in an infinite direction, and thus the scanning starts from the infinite direction. When the scanning start position is S2, the focus driving amount is smaller to reach the object A of the maximum focus driving amount in a proximal direction than that to reach the object C of the maximum focus driving amount in the infinite direction, and thus the scanning starts from the proximal direction. When the scanning start position is S3, the focus driving amount is smaller to reach the object C of the maximum focus driving amount in the infinite direction than that to reach the object A of the maximum focus driving amount in the proximal direction, and thus the scanning starts from the infinite direction. Hence, the in-focus position is detected in an order of objects A, B, and C when the scanning start position is S1, in an order of objects B, A, and C when the scanning start position is S2, and in an order of objects C, B and A when the scanning start position is S3.

Figure 9:
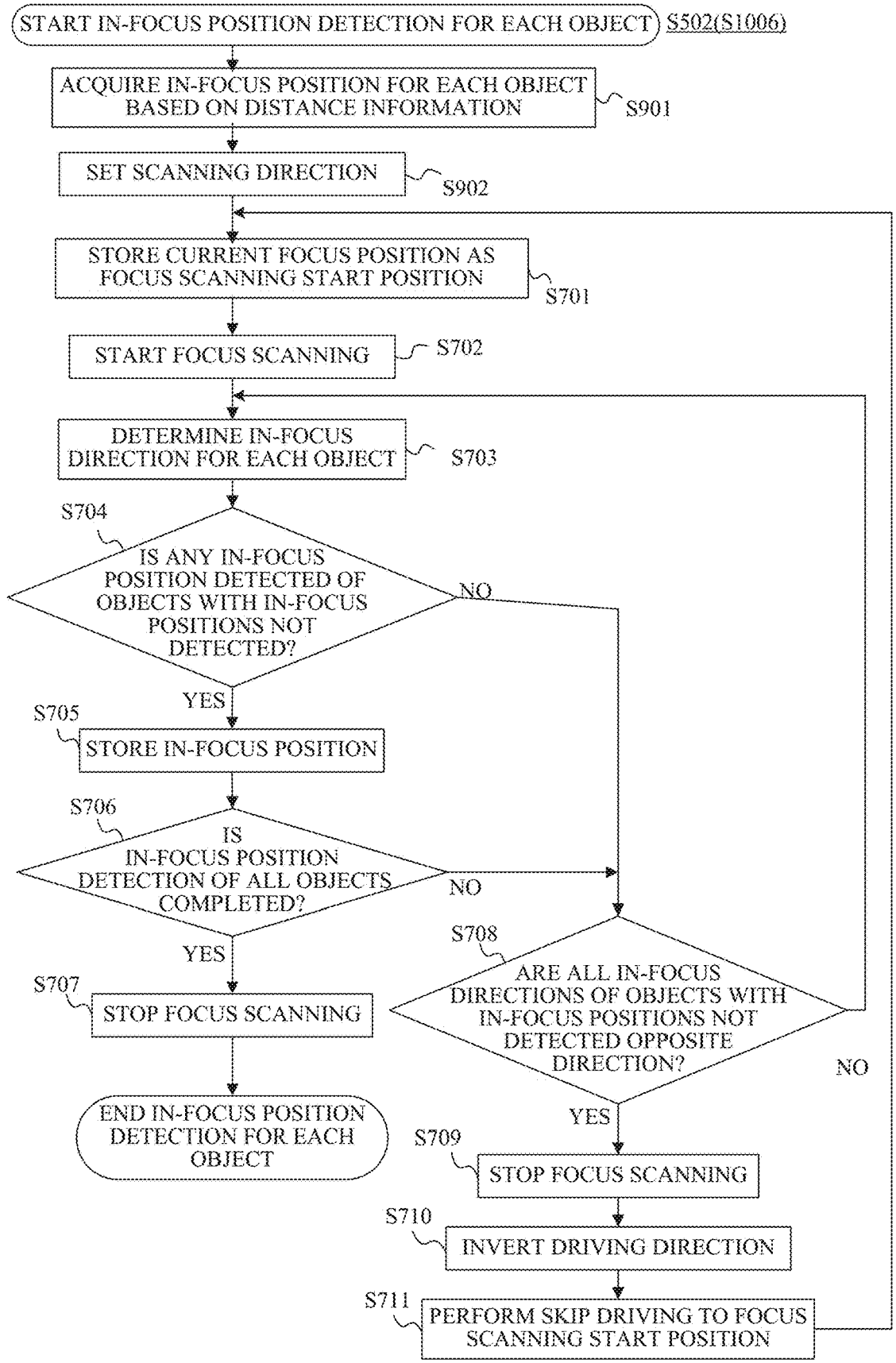
FIG. 9 is a flow chart illustrating the in-focus position detecting processing according to the second embodiment.

Next, a description will be given of the in-focus position detecting processing (the step S502) with reference to FIG. 9. FIG. 9 is a flow chart illustrating the in-focus position detecting processing. Each step in FIG. 9 are mainly executed by the tilt/focus driving amount calculator 114, the tilt/focus controller 115, or the focus driver 117.

First in the step S901, the tilt/focus driving amount calculator 114 acquires each in-focus position based on the distance information acquired by the focus evaluation value calculator 112 for each object. Subsequently in the step S902, the tilt/focus controller 115 determines the focus scanning start position as described above based on the focus position for each object calculated in the step S901. The subsequent processing in FIG. 9 is the same as that in the first embodiment described with reference to FIG. 7.

This embodiment determines the focus scanning direction based on the distance information based on the phase difference or the like in addition to the first embodiment, and thereby can realize a faster focus detection. Thus, it is possible to speed up the tilt control and the focus control for focusing on the plurality of objects.

Third Embodiment

Next, a description will be given of processing executed by the image pickup apparatus 100 in the third embodiment. In this embodiment, a description of the similar processing as that of the first embodiment or of the second embodiment will be omitted.

Figure 10:
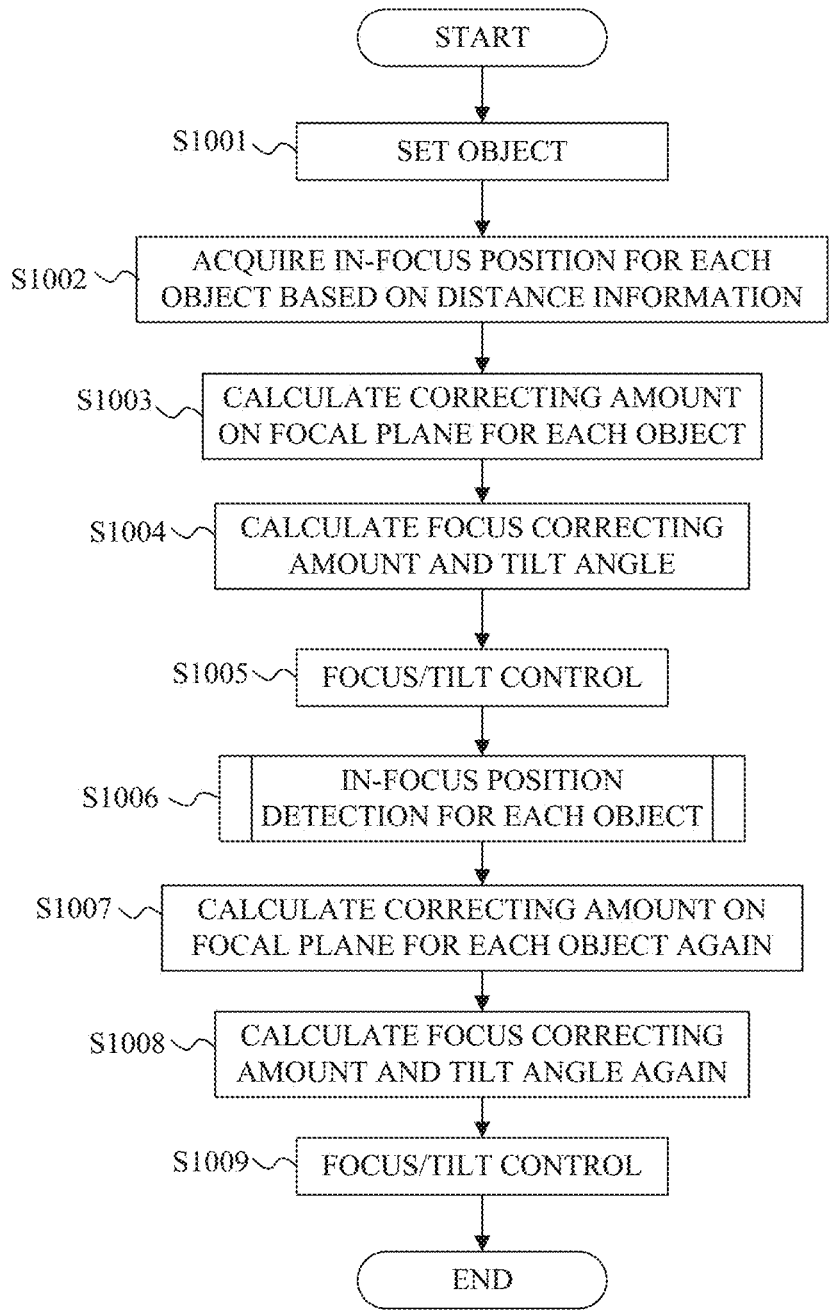
FIG. 10 is a flow chart illustrating a focus control and a tilt control according to a third embodiment.

FIG. 10 is a flow chart illustrating a focus control and a tilt control (main processing) in this embodiment. Each step in FIG. 10 are mainly executed by the tilt/focus driving amount calculator 114 or the tilt/focus controller 115.

First, in the step S1001, the tilt/focus controller 115 sets a plurality of objects. The tilt/focus driving amount calculator 114 acquires distance information on each of the plurality of objects. Subsequently in the step S1002, the tilt/focus driving amount calculator 114 acquires each in-focus position based on each distance information on each of the plurality of objects acquired in the step S1001. Subsequently in the step S1003, the tilt/focus driving amount calculator 114 calculates a correcting amount on a focal plane for each object based on the in-focus position acquired in the step S1002.

Subsequently in the step S1004, the tilt/focus driving amount calculator 114 calculates a focus correcting amount and a tilt angle for focusing on each object. Subsequently in the step S1005, the tilt/focus controller 115 controls the focus driver 117 and the image sensor driver 116 based on the focus correcting amount and the tilt angle calculated in the step S1004.

At this time, the focus and tilt correction has been performed once for focusing on the plurality of objects. However, as described above, the in-focus position based on the distance information acquired in the step S1002 may not be highly accurate, and this correction may not be sufficient. Thus, in the subsequent processing, a correction is performed based on the contrast evaluation value (also referred to as a second correction).

Subsequently in the step S1006, the tilt/focus controller 115 performs the similar processing as that in the flow described in the first embodiment 1 (FIG. 7) or the second embodiment (FIG. 9), and the in-focus position is detected for each object. Here, the focus scanning is performed after the tilt control, that is, in a state the image sensor 106 tilts, but the in-focus position can be detected by the similar processing as above-described in the flows.

Subsequently in the step S1007, the tilt/focus driving amount calculator 114 calculates a correcting amount on the focal plane for each object based on the in-focus position detected in the step S1006. Subsequently in the step S1008, the tilt/focus driving amount calculator 114 calculates a focus correcting amount and a tilt angle for focusing on each object.

Figure 11:
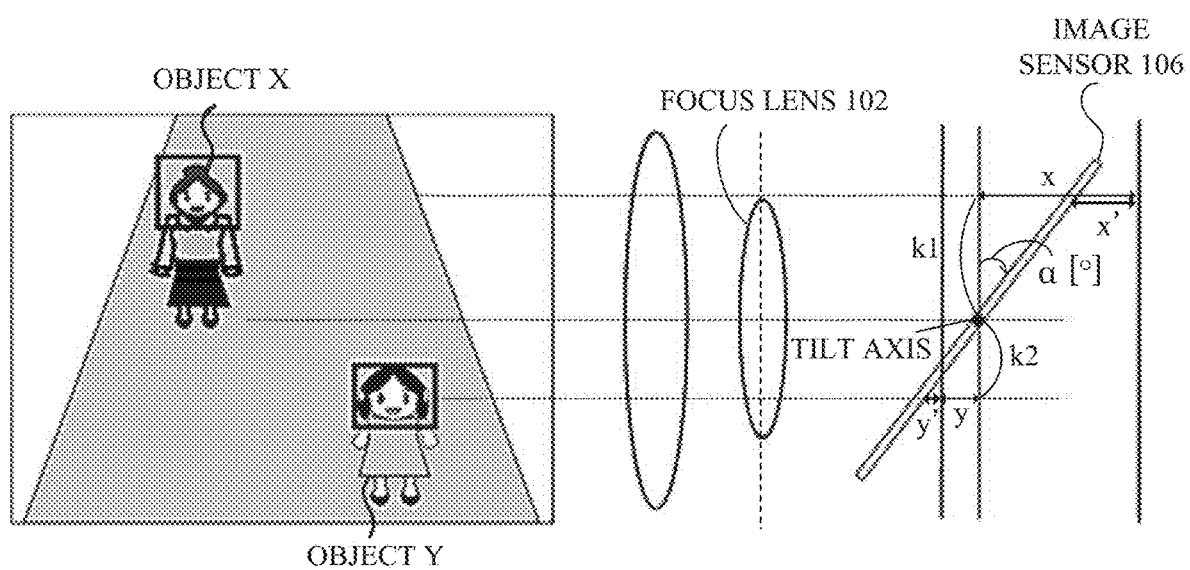
FIG. 11 is an explanatory diagram illustrating a focus control and a tilt control according to the third embodiment.

Here, an example will be described of a calculation after the tilt control, that is, in the state the image sensor tilts, with reference to FIG. 11. FIG. 11 is an explanatory diagram illustrating the focus control and the tilt control. In FIG. 11, an object X and an object Y exist as target objects, as the objects illustrated in FIG. 3. The current tilt angle and the position of the focus lens 102 have a positional relationship illustrated in FIG. 11. Unlike FIG. 3, the image sensor 106 has already tilted at the tilt angle α [°]. x' represents a correcting amount on the focal plane necessary for focusing on the object X, and y' represents a correcting amount on the focal plane necessary for focusing on the object Y, respectively calculated in the step S1007. By acquiring the correcting amounts x and y on the focal plane before a tilt, that is, when the tilt angle is α=0[°], the same focus correcting amount and tilt angle as described above can be calculated. The correcting amounts x and y are calculated using following expressions (9) and (10).

$$x = k1 \times \tan \alpha + x' \qquad (9)$$

$$y = k2 \times \tan \alpha - y' \qquad (10)$$

Subsequently in the step S1009, the tilt/focus controller 115 controls the focus driver 117 and the image sensor driver 116 based on the focus correcting amount and the tilt angle calculated in the step S1008.

This embodiment first performs the tilt control and the focus control for focusing on the plurality of objects based on the focus detection result of the plurality of objects using the distance information. Thereafter, this embodiment performs the tilt control and the focus control for focusing on the plurality of objects based on the in-focus position detection result by the focus scanning. In this embodiment, since the tilt control and the focus control are performed in advance, it is possible to reduce the focus scanning range. Thus, it is possible to speed up the tilt control and the focus control for focusing on the plurality of objects.

As described above, in each embodiment, a control apparatus (image pickup apparatus 100) includes an acquiring unit (focus evaluation value calculator 112) and a controlling unit (tilt/focus driving amount calculator 114, tilt/focus controller 115). The acquiring unit acquires a contrast evaluation value for each of a plurality of areas (at least two object areas) in an image. The controlling unit detects each in-focus position of each of the plurality of areas based on each contrast evaluation value. The controlling unit determines each in-focus direction of each of the plurality of areas based on each contrast evaluation value, and determines a focus driving direction based on the in-focus direction. The controlling unit determines the focus driving direction based on the in-focus direction of the other areas other than one of the plurality of areas when detecting the in-focus position of one of the plurality of areas.

The controlling unit may determine a target area in which an in-focus position is detected from the plurality of areas, and may determine an in-focus direction for the target area. The controlling unit may determine, as the target area, an area in which the in-focus position is not detected from the plurality of areas. The acquiring unit may acquire distance information on each of the plurality of areas, and the controlling unit may detect each in-focus position for each of the plurality of areas based on the distance information. The controlling unit may determine a detection order of the in-focus position of the target area based on the distance information. The controlling unit may determine the in-focus direction based on the distance information.

The controlling unit may invert the focus driving direction if all of the respective in-focus directions of the target areas are opposite to the focus driving direction. The controlling unit may execute a first focus control and a second focus control. The controlling unit stops the first focus control when inverting the focus driving direction in the first focus control. The controlling unit performs the second focus control to the vicinity of one of the position where the first focus control starts, the position where the focus driving direction is inverted last time, or the position where the maximum focus evaluation value is output of the first focus control for the target areas. The controlling unit may perform the second focus control with a second focus driving velocity that is faster than a first focus driving velocity of the first focus control. The controlling unit may determine the first focus driving velocity based on the focus evaluation value during the first focus control. The controlling unit may lower the first focus driving velocity if at least one of the focus evaluation values of the target areas is larger than a predetermined threshold in the first focus control. The controlling unit may raise the first focus driving velocity when all the focus evaluation values of the target area are smaller than the predetermined threshold in the first focus control.

The controlling unit may calculate the focus driving amount based on the in-focus position detected based on the distance information, and may start the focus control from a direction in which the maximum focus driving amount is small. The controlling unit may perform the tilt control and the focus control based on the in-focus position detected based on the distance information, and thereafter may perform the tilt control and the focus control based on the in-focus position detected based on the contrast evaluation value. The controlling unit may calculate a correcting amount for each of the tilt driving unit and the focus driving unit based on the in-focus position. The controlling unit performs the tilt control and the focus control using the tilt driving unit and the focus driving unit based on the correcting amount.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, an image pickup apparatus, a control method, and a storage medium each of which can detect an in-focus position of a plurality of objects at high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-173317, filed on Sep. 24, 2019, which is hereby incorporated by reference herein in its entirety.

What is claimed is:

1. A control apparatus comprising:
   at least one processor; and
   at least one memory coupled to the at least one processor storing instructions that, when executed by the at least one processor, cause the at least one processor to function as:
      an acquiring unit configured to acquire a contrast evaluation value for each of a plurality of areas in an image;
      a controlling unit configured to detect an in-focus position of a focus lens for at least one area of the plurality of areas based on the contrast evaluation value; and
      a setting unit configured to set a target area to detect the in-focus position from the plurality of areas,
   wherein the controlling unit determines whether or not the focus lens approaches the in-focus position of the target area based on the contrast evaluation value of the target area,
   wherein the controlling unit determines a driving direction of the focus lens based on a result of a determination, and
   wherein when the controlling unit has detected the in-focus position of the target area, the controlling unit determines the driving direction of the focus lens based on the contrast evaluation value of another area of the plurality of areas other than the target area.

2. The control apparatus according to claim 1,
   wherein the controlling unit determines, as the target area, an area in which the in-focus position is not detected from the plurality of areas.

3. The control apparatus according to claim 1,
   wherein the acquiring unit acquires distance information on each of the plurality of areas, and wherein the controlling unit detects the in-focus position for each of the plurality of areas based on the distance information.

4. The control apparatus according to claim 3, wherein the controlling unit determines a detection order of the in-focus position of the target area based on the distance information.

5. The control apparatus according to claim 3, wherein the controlling unit determines whether or not the focus lens approaches the in-focus position based on the distance information.

6. The control apparatus according to claim 1, wherein when the focus lens is driven in a direction in which all of each the contrast evaluation value of each target area is lowered, the controlling unit inverts the driving direction of the focus lens.

7. The control apparatus according to claim 1, wherein the controlling unit executes a first focus control and a second focus control, and
wherein when inverting the driving direction of the focus lens in the first focus control, the controlling unit stops the first focus control, and performs the second focus control to a vicinity of one of a position where the first focus control starts, a position where the driving direction of the focus lens is inverted last time, and a position where a maximum focus evaluation value is output in the first focus control for the target area.

8. The control apparatus according to claim 7, wherein the controlling unit performs the first focus control with a first driving velocity of the focus lens and performs the second focus control with a second driving velocity faster than the first driving velocity of the focus lens.

9. The control apparatus according to claim 8, wherein the controlling unit determines the first driving velocity of the focus lens based on the focus evaluation value during the first focus control.

10. The control apparatus according to claim 8, wherein when at least one focus evaluation value of one target area is larger than a predetermined threshold during the first focus control, the controlling unit slows down the first driving velocity of the focus lens.

11. The control apparatus according to claim 8, wherein when all of each focus evaluation value of each target area are smaller than a predetermined threshold during the first focus control, the controlling unit increases the first driving velocity of the focus lens.

12. The control apparatus according to claim 3, wherein the controlling unit calculates a driving amount of the focus lens based on the in-focus position detected based on the distance information, and
wherein the controlling unit starts a focus control from a direction in which a maximum value of the driving amount of the focus lens is small.

13. The control apparatus according to claim 3, wherein the controlling unit performs a tilt control and a focus control based on the in-focus position detected based on the distance information, and then simultaneously performs the tilt control and the focus control based on the in-focus position detected based on the contrast evaluation value.

14. The control apparatus according to claim 1, wherein the controlling unit calculates a correcting amount for each of a tilt driving unit and a focus driving unit based on the in-focus position, and
wherein the controlling unit performs a tilt control and a focus control using the tilt driving unit and the focus driving unit based on the correcting amount.

15. An image pickup apparatus comprising:
an image sensor; and
a control apparatus, wherein the control apparatus includes:
at least one processor; and
at least one memory coupled to the at least one processor storing instructions that, when executed by the at least one processor, cause the at least one processor to function as:
an acquiring unit configured to acquire a contrast evaluation value for each of a plurality of areas in an image;
a controlling unit configured to detect an in-focus position of a focus lens for at least one area of the plurality of areas based on the contrast evaluation value; and
a setting unit configured to set a target area to detect the in-focus position from the plurality of areas,
wherein the controlling unit determines whether or not the focus lens approaches the in-focus position of the target area based on the contrast evaluation value of the target area,
wherein the controlling unit determines a driving direction of the focus lens based on a result of a determination, and
wherein when the controlling unit has detected the in-focus position of the target area of the plurality of areas, the controlling unit determines the driving direction of the focus lens based on the contrast evaluation value of another area of the plurality of areas other than the target area.

16. A control method comprising:
an acquiring step configured to acquire a contrast evaluation value for each of a plurality of areas in an image;
a controlling step configured to detect an in-focus position of a focus lens for at least one area of the plurality of areas based on the contrast evaluation value; and
a setting step configured to set a target area to detect the in-focus position from the plurality of areas,
wherein the controlling step determines whether or not the focus lens approaches the in-focus position of the target area based on the contrast evaluation value of the target area,
wherein the controlling step determines a driving direction of a focus lens based on a result of a determination, and
wherein when the controlling step has detected the in-focus position of the target area of the plurality of areas, the controlling step determines the driving direction of the focus lens based on the contrast evaluation value of another area of the plurality of areas other than the target area.

17. A non-transitory computer-readable storage medium storing a computer program that causes a computer to execute the control method according to claim 16.

18. A control apparatus comprising:
at least one processor; and
at least one memory coupled to the at least one processor storing instructions that, when executed by the at least one processor, cause the at least one processor to function as:
a setting unit configured to set a first area in an image and a second area in the image;

an acquiring unit configured to acquire a first contrast evaluation value of the first area and a second contrast evaluation value of the second area;

a controlling unit configured to control a focus lens;

a detecting unit configured to detect a first in-focus position of the focus lens for the first area based on the first contrast evaluation value and to detect a second in-focus position of the focus lens for the second area based on the second contrast evaluation value; and a determining unit configured to determine whether or not the focus lens approaches the first in-focus position of the first area based on the first contrast evaluation value and to determine whether or not the focus lens approaches the second in- focus position of the second area based on the second contrast evaluation value, wherein the controlling unit controls the focus lens so that the focus lens drives in a driving direction determined based on a result of a determination, and wherein when the detecting unit has detected the first in-focus position of the first area, the controlling unit controls the focus lens so that the focus lens drives in a driving direction determined based on the second contrast evaluation value of the second area.

19. The control apparatus according to claim 18,
wherein when the detecting unit has detected the first in-focus position of the first area, the controlling unit controls the focus lens so that the focus lens drives in a driving direction determined based on the second contrast evaluation value of the second area in which the second in-focus position is not detected.

20. The control apparatus according to claim 18,
wherein the setting unit sets a third area in the image,
wherein the acquiring unit acquires a third contrast evaluation value of the third area, and
wherein when the detecting unit has detected the first in-focus position of the first area and the second in-focus position of the second area, the controlling unit controls the focus lens so that the focus lens drives in a driving direction determined based on the third contrast evaluation value of the third area.

21. The control apparatus according to claim 20,
wherein when the detecting unit has detected the first in-focus position of the first area and the second in-focus position of the second area, the controlling unit controls the focus lens so that the focus lens drives in a driving direction determined based on the third contrast evaluation value of the third area in which a third in-focus position is not detected.

22. The control apparatus according to claim 18,
wherein the acquiring unit acquires a first distance information on the first area and a second distance information on the second area, and
wherein the detecting unit detects the first in-focus position of the first area based on the first distance information and the second in-focus position of the second area based on the second distance information.

23. The control apparatus according to claim 22,
wherein the determining unit determines a detection order of the first in-focus position and the second in-focus position based on the first distance information and the second distance information.

24. The control apparatus according to claim 22,
wherein the controlling unit performs a tilt control and a focus control based on the first in-focus position detected based on the first distance information and the second in-focus position detected based on the second distance information, and then performs the tilt control and the focus control based on the first in-focus position detected based on the first contrast evaluation value and the second in-focus position detected based on the second contrast evaluation value.

25. A control method comprising:
setting a first area in an image and a second area in the image;
acquiring a first contrast evaluation value of the first area and a second contrast evaluation value of the second area;
controlling a focus lens;
detecting a first in-focus position of the focus lens for the first area based on the first contrast evaluation value and detecting a second in-focus position of the focus lens for the second area based on the second contrast evaluation value; and
determining whether or not the focus lens approaches the first in-focus position of the first area based on the first contrast evaluation value and determining whether or not the focus lens approaches the second in-focus position of the second area based on the second contrast evaluation value,
wherein the focus lens is controlled so that the focus lens drives in a driving direction determined based on a result of a determination, and
wherein when the first in-focus position of the first area has been detected, the focus lens is controlled so that the focus lens drives in a driving direction determined based on the second contrast evaluation value of the second area.

26. A non-transitory computer-readable storage medium storing a computer program that causes a computer to execute a control method comprising;
setting a first area in an image and a second area in the image;
acquiring a first contrast evaluation value of the first area and a second contrast evaluation value of the second area;
controlling a focus lens;
detecting a first in-focus position of the focus lens for the first area based on the first contrast evaluation value and detecting a second in-focus position of the focus lens for the second area based on the second contrast evaluation value; and
determining whether or not the focus lens approaches the first in-focus position of the first area based on the first contrast evaluation value and determining whether or not the focus lens approaches the second in-focus position of the second area based on the second contrast evaluation value,
wherein the focus lens is controlled so that the focus lens drives in a driving direction determined based on a result of a determination, and
wherein when the first in-focus position of the first area has been detected, the focus lens is controlled so that the focus lens drives in a driving direction determined based on the second contrast evaluation value of the second area.

* * * * *